June 30, 1931.  A. R. LE BAILLY  1,811,946
LEVEL INDICATOR
Filed June 13, 1927  4 Sheets-Sheet 1
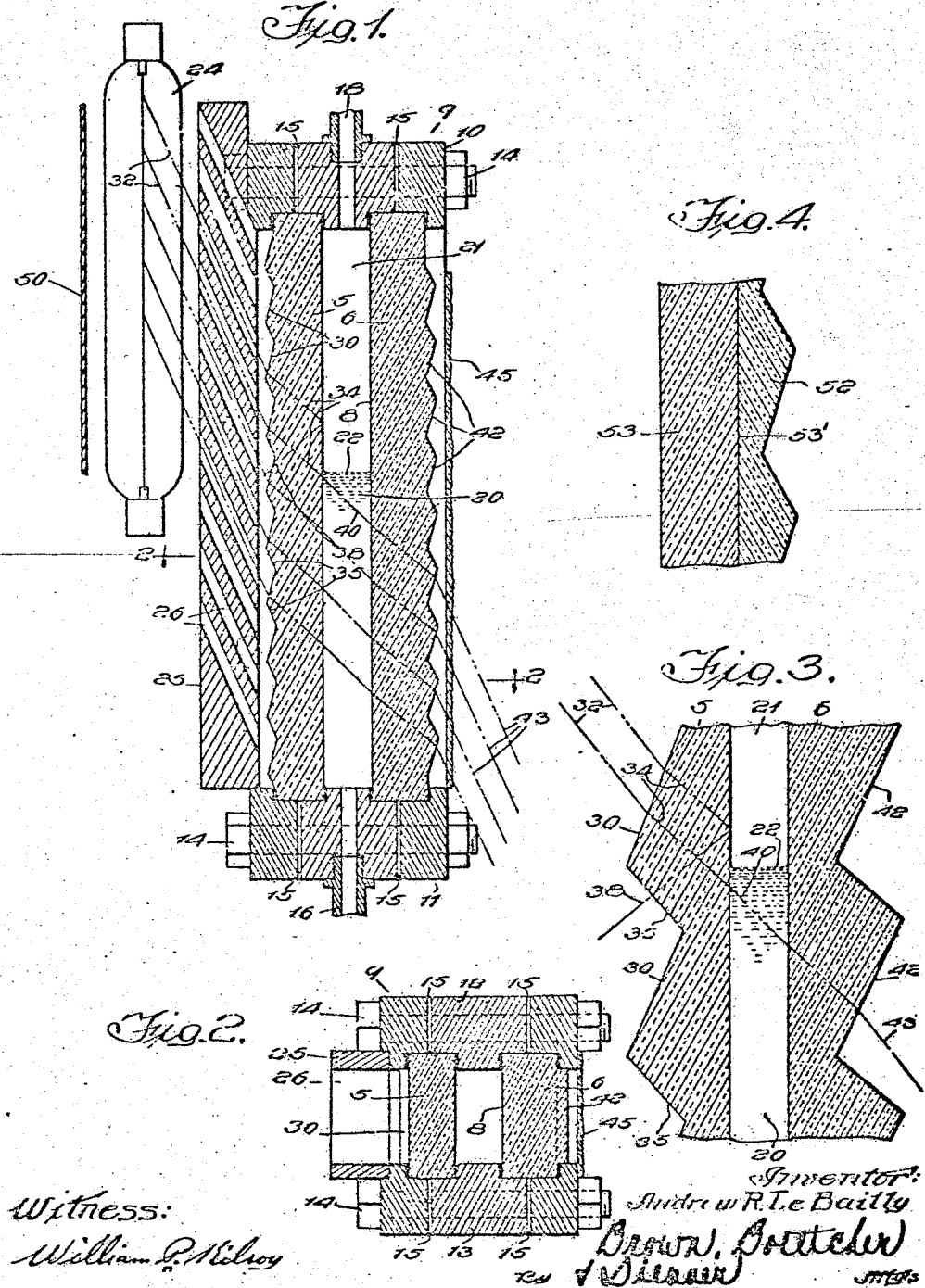

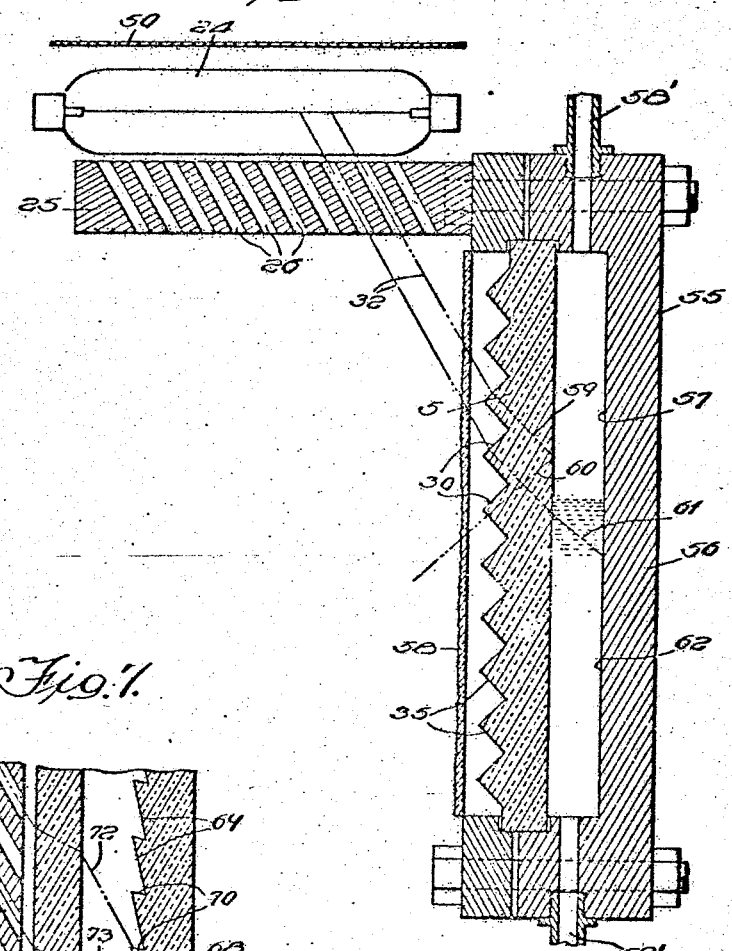
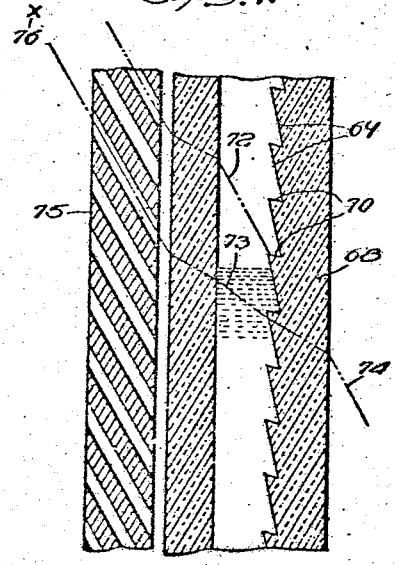
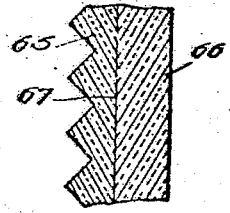

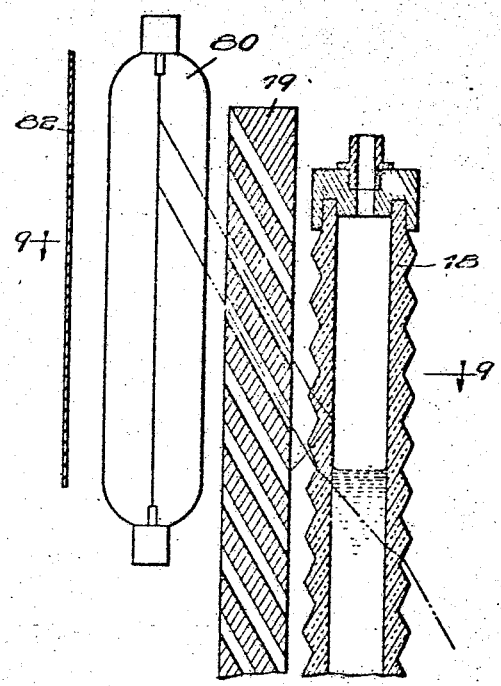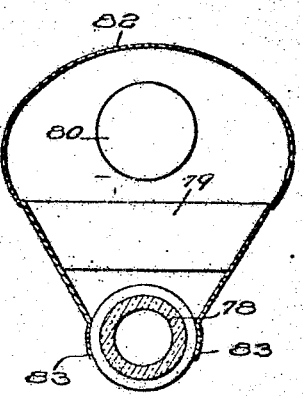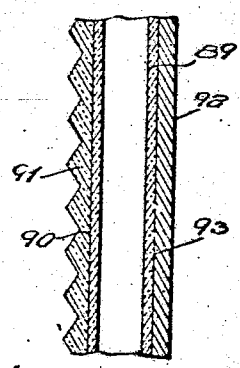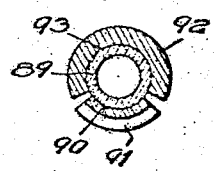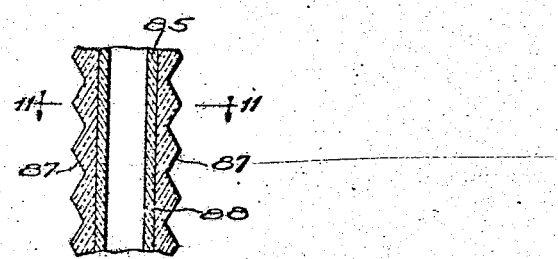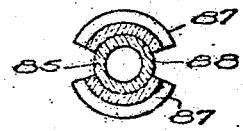

June 30, 1931.  A. R. LE BAILLY  1,811,946
LEVEL INDICATOR
Filed June 13, 1927  4 Sheets-Sheet 4
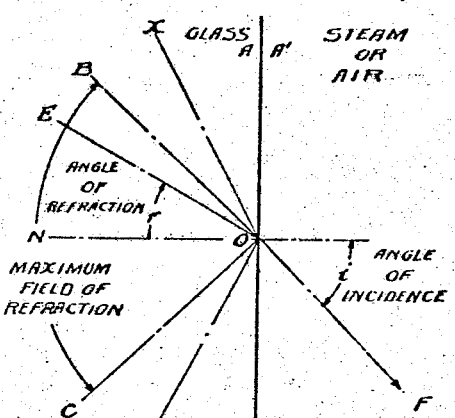
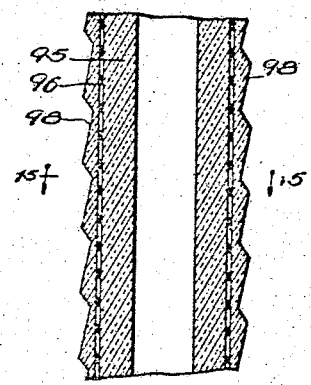
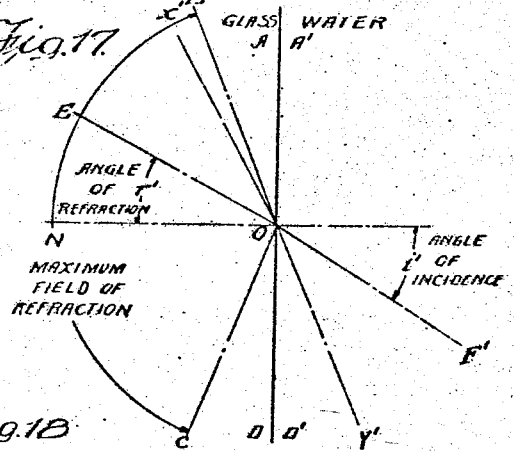
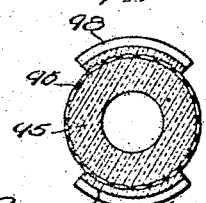
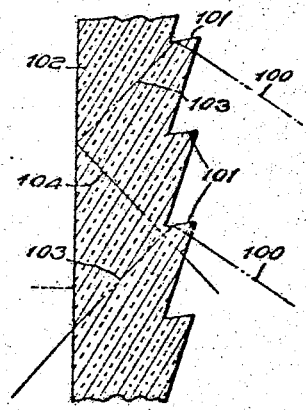
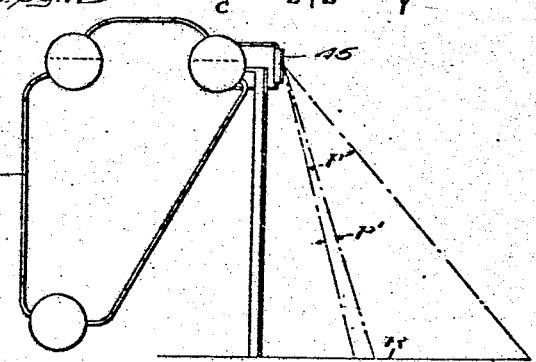
Inventor:
Andrew R. LeBailly Patented June 30, 1931

1,811,946

UNITED STATES PATENT OFFICE

ANDREW R. LE BAILLY, OF CHICAGO, ILLINOIS

LEVEL INDICATOR

Application filed June 13, 1927. Serial No. 198,630.

This invention relates to level indicators and its object is the provision of a generally improved and simplified indicator based on the different critical angles of refraction of different fluids or media and upon the phenomenon of total reflection of parallel rays of light when their incident angle is beyond the critical refraction angle of the transparent material on one of the fluids.

The indicator of the present invention is adapted for use as a boiler gauge and it has particular utility for indicating two remote positions and at difficult angles. This is advantageous where it is desirable to position the gauge relatively high as now commonly necessary and it avoids the necessity of the attendants ascending to and descending from the gauge every time that a reading is desired.

It is to be understood, however, that the invention is not to be limited to any particular use or purpose but may be employed as and where suitable or desired.

I shall describe the indicator in connection with a boiler installation but this is illustrative and not limiting and the fluids may be other than water and steam.

According to the present invention the parallel rays of light are directed thru the transparent material and upon the fluid column at an angle beyond the critical refraction angle of the transparent material on one of the fluids and within the critical refraction angle of the transparent material upon the other fluid. Where the rays of light are intercepted by the fluid with the lesser critical angle, total reflection of the rays will occur and where the rays of light are intercepted by the fluid with the greater critical angle they are refracted thru the fluid.

The invention provides for indicating the level on the side of the indicator opposite the position of the source of light by the rays which are refracted thru the fluid with the greater critical angle or for indicating the level on the same side on which the source of light is positioned by the rays which are refracted by the fluid with the lesser critical angle.

I am aware that level indicators based on the different indices of refraction of different fluids have been provided, but in previous devices of this sort a plurality of apertured plates have been required and the indication has been dependent upon the proper relationship between the inclined apertures in one plate with respect to those in the other plate.

The present invention avoids this and even provides for producing the indication by the different indices of refraction without the second apertured or selector plate heretofore required.

I also provide for inexpensively embodying the invention in existing indicators, conveniently and with little alteration.

The invention is equally as applicable to tubular indicators and to indicators of the flat plate type and the indicating side of the gauge may be provided with a suitable diffuser for increasing or widening the field of visibility. The diffuser plate may be multicolored or otherwise distinctly finished upon opposite sides of a predetermined level to indicate according to the character of the field in which the light is diffused whether the level is above or below the predetermined level.

To acquaint those skilled in the art with the construction and operation of several embodiments of the invention I shall now describe same in connection with the accompanying drawings in which:

Fig. 1 is a vertical and more or less diagrammatic section thru one embodiment of the invention.

Fig. 2 is a horizontal section taken on the line 2—2 of Fig. 1.

Fig. 3 is an enlarged fragmentary section thru the transparent plates shown in Fig. 1.

Fig. 4 is a fragmentary section thru an alternative arrangement for embodying the invention in an existing gauge.

Fig. 5 is a sectional view similar to Fig. 1, of another embodiment of the invention.

Fig. 6 is a fragmentary detailed section showing the manner of embodying the invention in an existing gauge of the type shown in Fig. 5.

Fig. 7 is a fragmentary vertical section thru another embodiment.

Fig. 8 is a view similar to Fig. 1, thru another embodiment.

Fig. 9 is a horizontal section taken on the line 9—9 of Figure 8.

Fig. 10 is a fragmentary detail vertical section showing the embodiment of the features of Fig. 8, in an existing gauge.

Fig. 11 is a section taken on the line 11—11 of Fig. 10.

Fig. 12 is a fragmentary vertical section thru another embodiment.

Fig. 13 is a detail horizontal section on the line 13—13 of Fig. 12.

Fig. 14 is a fragmentary vertical section thru another embodiment.

Fig. 15 is a horizontal section taken on the line 15—15 of Fig. 14.

Fig. 16 is a diagram indicating the maximum field of refraction of glass on steam or air showing a ray of light within this field and refracted on thru the steam or air and another ray outside the field of refraction and reflected.

Fig. 17 is another diagram indicating the maximum field of refraction of glass on water with both of the rays of Fig. 16, within this field and both refracted thru the water;

Fig. 18 is a more or less diagrammatic view showing one use of the present invention; and Fig. 19 is a fragmentary section of another embodiment.

Referring to the drawings, the gauge shown in Figs. 1, 2, and 3 is of the plural plate type having a pair of transparent walls or plates 5 and 6 defining between them the column 8 for the fluid the level of which is to be ascertained or indicated. The transparent plates or walls 5 and 6 may be of glass or other suitable transparent material and the sides and top and bottom of the column 8 are closed by a suitable frame 9 having upper and lower head portions 10 and 11 respectively and vertical side portions 12 and 13.

The particular frame 9 shown is sectionalized with the sections clamped together with the glass walls 5 and 6 in position by bolts 14. The sections of the frame may be gasketed at 15 and the details of construction of the gauge per se may be varied widely within the scope of the present invention.

Where the indicator is used as a boiler gauge the lower frame portion 11 may be provided with a suitable water connection 16 and the upper frame portion 10 provided with a suitable steam connection 18. Obviously the indicator may be used for indicating the level of any other desired fluid and the fluids 20 and 21 may be any fluids or media having different critical refraction angles. The fluid 20 may for example be water with the overlying fluid 21 air instead of steam. The level of the water or other lower fluid 20 is indicated at 22 in Fig. 1.

A suitable source of light 24, preferably a relatively high power bulb although this may vary, is disposed in front of the plate 5 and suitable means is provided, such as a filter or screen 25 interposed between the plate 5 and the source of light 24 for directing only parallel rays of light upon the plate 5. A parabolic reflector or other suitable means may be employed for directing only parallel light rays upon the plate 5. Where a filter or screen 25 is employed it may comprise a suitable opaque plate having downwardly inclined relatively wide slots 26 extending therethrough and directing the parallel rays of light downwardly at an angle upon the plate 5. Alternatively the filter 25 may comprise alternate downwardly inclined laminæ of transparent and opaque material or it may be otherwise formed to direct the rays of light parallel with each other and at an angle downwardly upon the plate 5.

As shown in Fig. 1, and more particularly in Fig. 3, the outer surface of the glass wall or plate 5 is divided into a plurality of upwardly presented inclined faces 30 parallel with each other and at such an angle that the incident parallel light rays indicated at 32 are refracted at 34 thru the plate 5 as indicated at 34 at an angle between the respective critical refraction angles of the fluids contained within the gauge. The inclination of the oppositely inclined faces 35 is preferably such as to remove these faces from intercepting the incident rays 32. They are shown as being substantially parallel with the incident rays of light.

The manner of calculating the critical angle between glass and steam or air is as follows:

Index of refraction $k = \dfrac{\sin i}{\sin r}$

Critical angle $\sin i = 1$ $\sin r = \dfrac{1}{k}$

Between steam and glass, $k = 1.46$
$\sin r$ (critical) $= 0.685$
Or critical angle $r = 43°$ Therefore all incident rays of light in the angles AOB and COD are not refracted thru the steam but are reflected back thru the glass as indicated at XOY.

For water and glass:

$$k' = \frac{\sin i}{\sin r'}$$
$$\sin i' = 1$$
$$\sin r' = \frac{1}{k'}$$

Water and glass, $k' = 1.08$
Sin $r'$ (critical) $= 0.93$
Or critical angle $r' = 70°$ Therefore all incident rays in angles AOB and COD are not refracted thru the water but are reflected back thru the glass and all incident rays between the angles AOB of Fig. 16 and AOB of Fig. 17 and between the angles COD of Fig. 16 and the angle COD of Fig. 17 will be reflected where steam is encountered and will be refracted where water is encountered.

The faces 30 are as already pointed out at such an angle that the light rays are refracted therein at an angle between the respective critical refraction angles of the steam and water or other fluids contained within the gauge so that where steam 21 is encountered the refracted rays 34 are reflected at 38 back thru the glass whereas where the water is encountered the refracted rays 34 are further refracted thru the water at 40 and thru the glass plate or wall 6 on the opposite side.

The opposite or rear side of the plate 6 has inclined faces 42 which may, for example, be parallel with the faces 30 and from which the light rays are directed at 43 downwardly upon and thru a suitable diffuser 45. The inclination of the surfaces 42 is such that the rays can emerge from the plate 6 and to avoid total reflection of the emerging rays back therethru. The diffuser 45 may consist, for example, of a glass plate ground on one side and having thereon a plurality of bosses, indications or other irregularities for diffusing the light and the plate 45 is so disposed that it will receive the rays refracted thru the water and by its use the indications furnished by the issuing rays that refraction by the water can be observed from a distant point. The operation of a diffuser of this sort is well understood in the art and the details of the diffuser per se may be varied. The diffuser may be omitted entirely where desired. The diffuser plate 45 is illuminated by these rays below the uppermost ray which is refracted thru the water depending upon its level and by the level of the light on the diffuser the level of the water in the gauge can be readily ascertained from a distance and at different angles.

For example where the indicator is used as a boiler gauge and is arranged at a comparatively great height as indicated in Fig. 18 as is commonly necessary and as indicated in Fig. 18, the observer may at a much lower position on the floor R ascertain by the level of the light on the diffuser 45 the level of the water within the gauge. A typical boiler setting is indicated at 48 and with the diffuser a larger field of visibility at P may be provided or by removing the diffuser a relatively narrow field of visibility may be secured as indicated at P'.

The source of light 24 may be provided with a suitable backing or reflector 50 as desired. The condition of the water level may be readily ascertained from below the gauge and at an angle of say 45° and the observer will see a continuous streak of light corresponding to the height of the water level.

The diffuser plate may be multi-colored or otherwise distinctly finished upon opposite sides of a predetermined level to indicate according to the character of the field in which the light is diffused whether the level is above or below the predetermined level.

Additional transparent gaskets may, of course, be added, to protect the refracting plates from the undesirable action of the fluids without impairing the operation of the apparatus.

In the embodiment of Fig. 4, I have shown a suitable refracting plate 52 for embodying the invention in a gauge provided with parallel transparent plates.

The ordinary parallel faced plate is indicated at 53 and the refracting plate of the present invention is secured thereto by a suitable transparent cement binder 53' or otherwise as desired. This provides for inexpensively embodying the invention in existing indicators conveniently and with little alteration, the inclination of the faces of the transparent plate 52 being such that the parallel incident light rays are refracted therein at an angle between the respective critical refraction angles of the fluids contained in the gauge.

In Fig. 5, the transparent plate 6 is omitted and the frame 55 has an integral opaque back 56 closing the back or rear side of the fluid column 57 which is provided with steam and water connections 58' and 59' respectively or other suitable fluid connections.

In this case the transparent front plate or wall 5 is provided with the inclined faces 30, as before, the angles of which are such that the incident parallel light rays 32 are refracted therein at an angle between the respective critical refraction angles of the fluids within the gauge. The source of light 24 is shown as disposed horizontally with the filter or screen 25 positioned to direct only parallel incident rays upon the transparent plate 5. The source of light 24 may be provided with a suitable backing or reflector 50 as before.

In this case, however, indication is given on the side on which the light is disposed; where there is a diffuser it is disposed at 58 in front of or on the same side of the plate 5 on which the source of light 24 is disposed. Because of their angle between the respective critical angles of the water and steam or other fluids the refracted rays 59 are totally reflected at 60 where the steam or air is encountered and are refracted at 61 thru the water where the water is encountered.

In this case the continuous streak of light upon the diffuser 58 for indicating the level of the water within the gauge is produced by the totally reflected rays 60 instead of by the rays refracted thru the water as before. The inner surface 62 of the rear wall 56 is preferably unpolished and of dark color or otherwise finished so that the rays 61 penetrating the water or one of the fluids will not be reflected.

In this embodiment obviously only one transparent plate is required and the matter of sealing and the other problems are reduced. This embodiment indicates the condition of the fluid level to remote positions and at difficult angles, just as before and may be conveniently viewed, for example from below the gauge and at angles of 45 degrees and less.

In Fig. 6, I have shown a transparent plate 65 for embodying the invention in a gauge of the type shown in Fig. 5, with a parallel faced transparent plate 66. The plate 65 having the desired inclined faces is secured to the plate 66 by a cementitious transparent binder 67 or otherwise as desired.

In Fig. 7, I have provided for producing the desired level indication without directing the rays between the critical refraction angles of the transparent material of the different fluids and without an additional filter of selector screen.

In this case the inner surface of the rear transparent plate or wall 68 is corrugated or divided into two groups of generally parallel surfaces 69 and 70 respectively. The surfaces 70 are covered or otherwise suitably finished to make them opaque. These opaque surfaces 70 are positioned to intercept the rays 72 which penetrate the steam or air while the rays 73 due to their different refraction by the water strike the surfaces 69 where the water is encountered and are refracted thru the plate 68 being directed therefrom at 74 and upon a suitable diffuser as desired to give the indication of the liquid level within the gauge. The filter for paralleling the incident rays is indicated at 75 and the source of light is indicated diagrammatically at 76. The indication in this case is secured by the different indices of refraction of the different fluids and without the necessity of additional screens or the like.

In Figs. 8 and 9 the invention is embodied in a gauge in which the fluid column 8 is defined by a tube 78 of glass or other suitable transparent material. The operation of this form is substantially as described in connection with Fig. 1. The source of light is indicated at 80 with the interposed filter indicated at 79 and the reflector or backing 82 is shown as extending around the light source 80 along the sides of the filter 79 and partially embracing the tube 78 at 83, 83. The tube 78 is open for vision between the front margins of the embracing sides 83 of the reflector 82.

In Figs. 10 and 11, the invention is shown as applied to a straight walled tube 85. The refractor 86 may be in the form of a sleeve or it may be made up of separate refractor parts 87 as shown in Fig. 11, suitably secured as by means of a transparent cementitious binder 88 upon the outer surface of the tube 85.

In Figs. 12 and 13, the single side embodiment of Fig. 5 is embodied in a tube type gauge. The straight walled tube 89 has secured thereto as by a suitable cementitious transparent binder 90 the refractor 91 on one side. The opposite side of the tube 89 is covered by a steel or other suitable guard 92 the surface 93 of which is preferably unpolished and of dark color or otherwise finished so that the rays of light penetrating one of the fluids will not be reflected whereas the indication is given by the reflection of the rays from the other fluid. The steel guard 92 surrounding the glass tube 89 acts additionally as a reinforcement and a safety device in the case of breakage and it may be cemented or otherwise suitably secured to the tube.

In Figs. 14 and 15, the invention is again embodied in a tube type gauge with another reinforcing provision for the tube. The tube is indicated at 95 and is embraced by a perforated metal sleeve 96 which may be suitably forced upon the tube and the refractive strips or members 98 are secured upon the tube over the sleeve 96 as by suitable cementitious transparent material.

The mesh sleeve 96 reinforces and strengthens the tube 95 and the mesh of the sleeve 96 may be relatively small so as to not obstruct the visibility. The small size of the reinforcement would not obstruct the visibility especially if slightly diffusing glass is used.

The perforations in the reinforcing sleeve 96 give the sleeve enough flexibility to expand with the glass and an alloy having the same heat expansion co-efficient as glass could obviously be used.

In Fig. 19 the incident rays 100 are directed in parallelism by any suitable means, not shown, upon the surfaces 101 of the glass plate 102 the angle of which is such that the rays are totally reflected therefrom at 103 at an angle between the critical refraction angles of the fluids. This produces a series reflection at 104 where one fluid is encountered and refraction thru the other fluid where it is encountered. The raised position of the source of light and the relatively steep angle of the incident rays is thus avoided.

With the provisions of Figs. 4, 6, 10, 12, and 14 the flat sided glass walls may be of glass of a character to withstand high pressures and the like while the refracting members may be of a different glass, for example, one that is more easily brought to the desired form.

I claim:

1. The method of indicating the relative positions of fluids with different critical refraction angles which comprises directing parallel rays of light toward said fluids at an angle between the critical refraction angles of the fluids to produce only reflected rays where one fluid is encountered and only refracted rays thru the other fluid and conveying one group of rays thus produced to the observer.

2. The method of indicating the level of a fluid which comprises passing parallel rays of light toward said fluid at an angle between the critical refraction angle of the fluid and the critical refraction angle of the medium above the fluid to produce total reflection of the rays above the fluid and total refraction of the rays thru the fluid below said level and conveying one group of rays, thus produced to the observer.

3. The method of indicating the level of a fluid which comprises directing incident rays of light in parallelism upon a transparent wall in front of the fluid column, which wall is constructed for refracting said rays at an angle between the critical refraction angle of the fluid and the critical refraction angle of the medium above the fluid to produce total reflection of the rays above the fluid level and total refraction of the rays thru the fluid below said level and conveying one group of rays thus produced to the observer.

4. The method of indicating the relative positions of fluids with different critical refraction angles which comprises directing incident rays of light in parallelism upon a transparent wall in front of the fluids, which wall is constructed for refracting said rays at an angle between the critical refraction angles of the fluids to produce only reflected rays where one fluid is encountered and only refracted rays thru the other fluid and conveying one group of the resultant rays to the observer.

5. The method of indicating the relative positions of fluids with different critical refraction angles which comprises directing incident rays of light in parallelism upon a transparent wall in front of the fluids, which wall is constructed for refracting said rays at an angle between the critical refraction angles of the fluids to produce only reflected rays where one fluid is encountered and only refracted rays where the other fluid is encountered and diffusing one group of rays thus produced to indicate to the observer the relative positions of said fluids.

6. In combination, a column for fluids with different critical refraction angles, a source of light, means for directing parallel rays of light from said source toward said column and a transparent wall interposed between said means and the fluid column and formed to refract all incident parallel light rays at an angle between the respective critical refraction angles of the fluids.

7. In combination, a column for fluids with different critical refraction angles, a source of light, means for directing only parallel rays of light from said source toward said column and a transparent wall interposed between said means and the fluid column and divided into a plurality of surfaces inclined at an angle to refract all incident parallel rays at such an angle that said rays will be reflected where one fluid is encountered and refracted thru the other fluid.

8. In combination, a column for fluids with different critical refraction angles, a source of light, means for directing only parallel rays of light from said source toward said column and a transparent wall interposed between said means and the fluid column and divided into a plurality of surfaces inclined at an angle to refract all incident parallel rays at such an angle that said rays will be reflected where one fluid is encountered and the surfaces of said transparent wall between said inclined surfaces being positioned wholly without the path of said parallel incident rays.

9. In a fluid level indicator, means for directing only parallel rays of light from a source, and a transparent wall shaped to refract all incident parallel rays of light transmitted thereto by said means at an angle between the respective critical refraction angles of the fluids within the indicator.

10. In combination, a column for fluids with different critical refraction angles, a source of light, means for directing only parallel rays of light from said source toward said column, and a transparent wall interposed between said means and the fluid column and formed to refract all incident parallel light rays at such an angle that said rays will be reflected where one fluid is encountered and refracted thru the other fluid said combination being arranged to convey the refracted rays to the observer to indicate the level of the fluid.

11. As an article of manufacture a transparent refracting wall adapted for installation in parallel surfaced gauges and faces formed on said wall to refract parallel rays of light at such an angle that they will be reflected back therethru where one fluid is encountered and refracted thru a fluid having a different critical refracting angle.

12. In a level gauge, an ordinary parallel sided transparent wall, a transparent refracing wall divided into surfaces inclined to refract rays of light at such an angle that they will be reflected back thru the transparent wall where one fluid is encountered and refracted thru a fluid having a different critical refracting angle and means securing said transparent refracting wall to said first transparent wall.

13. In a level indicator, a diffuser, for receiving rays of light for indicating the level of a fluid to be observed, said diffuser having oppositely disposed faces, a characteristic finish on said faces on one side of a predetermined fluid level point and a distinctively different characteristic finish on said faces on the opposite side of said point, said finishes assisting to indicate the level of said observed fluid relative to said point.

14. In a level indicator, a gauge tube, a perforated reinforcing sleeve surrounding said tube, and a transparent refracting member secured upon the tube over said reinforcing sleeve.

15. In a level indicator, a gauge tube, a source of light, means for refracting the rays of light at such an angle that they will be reflected back where one fluid is encountered within the tube and refracted on thru a fluid having a different critical refraction angles and a reinforcing guard for the tube with the surface of said guard presented to the light finished so that the rays of light penetrating one fluid will not be reflected.

16. The method of determining the relative positions of fluids with different critical refracting angles which comprises directing parallel rays of light against said fluids at an angle between the critical refraction angles of the fluids to produce reflected rays where one fluid is encountered and refracted rays through the other fluid.

17. The method of determining the level of a fluid which comprises passing rays of light against said fluid at an angle between the critical refraction angle of the fluid and the critical refraction angle of the medium above the fluid to produce total reflection of the rays above the fluid and refraction of the rays through the fluid below said level 18. The method of determining the level of a fluid which comprises directing incident rays of light in parallelism upon a transparent wall in front of the fluid column, which wall is constructed for refracting said rays at an angle between the critical refraction angle of the fluid and the critical refraction angle of the medium above the fluid to produce total reflection of the rays above the fluid level and refraction of the rays through the fluid below said level.

19. The method of determining the relative positions of fluids with different critical refraction angles which comprises directing incident rays of light in parallelism upon a transparent wall in front of the fluids, which wall is constructed for refracting said rays at an angle between the critical refraction angles of the fluids to produce only reflected rays where one fluid is encountered and only refracted rays through the other fluid.

In witness whereof, I hereunto subscribe my name this 9th day of June, 1927.

ANDREW R. LE BAILLY.